Sept. 8, 1942.　　　　A. F. SCHUMERT　　　　2,295,057
AUTOMATIC RADIO CONTROLLING MEANS
Filed Aug. 20, 1940　　　　7 Sheets-Sheet 1

Fig.1.

WITNESS
H. Woodard

Inventor
A. F. Schumert
By H. B. Willson &Co
Attorneys

Sept. 8, 1942.  A. F. SCHUMERT  2,295,057
AUTOMATIC RADIO CONTROLLING MEANS
Filed Aug. 20, 1940  7 Sheets-Sheet 2

Fig. 2.

WITNESS
H. Woodard

Inventor
A. F. Schumert
By
H. B. Willson Leo
Attorneys

Sept. 8, 1942. A. F. SCHUMERT 2,295,057
AUTOMATIC RADIO CONTROLLING MEANS
Filed Aug. 20, 1940 7 Sheets-Sheet 3

Inventor
A. F. Schumert

Sept. 8, 1942.  A. F. SCHUMERT  2,295,057
AUTOMATIC RADIO CONTROLLING MEANS
Filed Aug. 20, 1940  7 Sheets-Sheet 4

Inventor
A. F. Schumert

Sept. 8, 1942.   A. F. SCHUMERT   2,295,057
AUTOMATIC RADIO CONTROLLING MEANS
Filed Aug. 20, 1940   7 Sheets-Sheet 7

Fig. 12.

Inventor
A. F. Schumert

Patented Sept. 8, 1942

2,295,057

UNITED STATES PATENT OFFICE 2,295,057

AUTOMATIC RADIO CONTROLLING MEANS

Arthur F. Schumert, Belleville, Ill.

Application August 20, 1940, Serial No. 353,428

7 Claims. (Cl. 161—1)

The invention relates to a new and improved automatic controlling mechanism for radio receiving sets.

One object is to provide a novel controlling means which may be easily set to automatically turn a radio on at any selected time, and to automatically turn it off at the expiration of a predetermined period within one hour, enabling the reception of any desired program without the necessity of turning the set on by hand, and also overcoming the necessity of turning the set off by hand at the end of the program.

Another object is to provide a novel controlling means which permits the set to be turned on by hand and operated for any selected period of no more than one hour duration, and will then automatically turn the set off.

Yet another object is to provide an automatic controlling means which will not interfere with turning the radio set both on and off by hand, as usual.

A still further aim is to provide a novel controlling means which, when once set for reception at a selected time during the day or night, will turn the radio on at said selected time each succeeding day or night but will not turn the set on during the night if set for operation during the day, or vice versa.

A still further object is to provide a novel controlling means which may be quickly and easily set by manipulation of one control knob.

With the foregoing and minor objects in view, the invention resides in the novel subject matter hereinafter described and claimed, description being accomplished by reference to the accompanying drawings.

Figure 3 is a front elevation.

The construction selected for illustration will be rather specifically described, with the understanding, however, that within the scope of the invention as claimed, variations may be made. This selected construction includes an electric clock mechanism, but it is to be understood that any suitable chronometric mechanism could well be used instead of an actual clock mechanism. Therefore, such expressions as "clock mechanism," "clock-actuated," etc. are not to be considered as limiting. It may also be explained at the outset that an appropriate electric light will be provided to aid in setting the dials of the mechanism but to simplify the disclosure, such a light and its circuit have been omitted, it being of course well within the realm of the radio technician to supply same.

Figure 11:
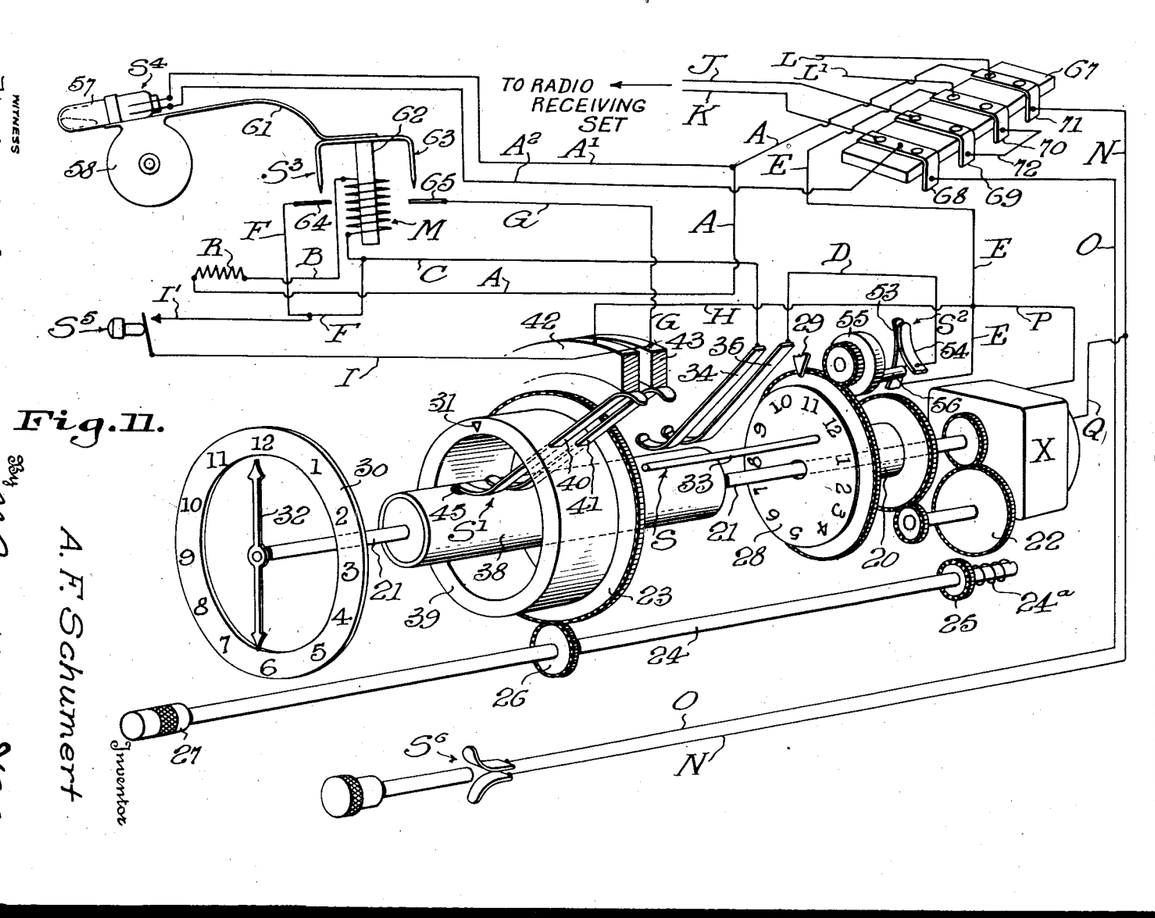
Figure 11 is a diagrammatic perspective view diagrammatically illustrating all necessary wiring.
Figure 12:
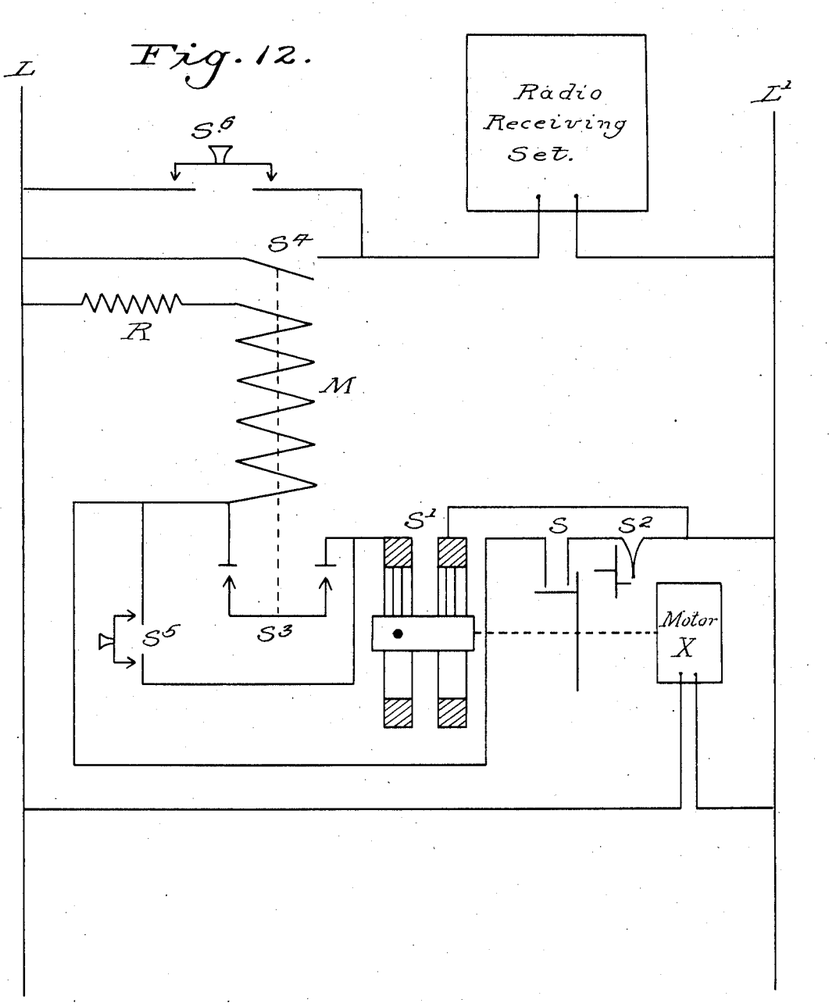
Figure 12 is an "across the line" diagram in which the circuits may be more expeditiously traced than in Fig. 11.

For a general understanding before going into detail, reference may be had to Figs. 11 and 12 in particular. A tiltable mercury switch $S^4$ is shown to either complete or break the radio circuit, according to the position to which it is tilted, said switch normally occupying an open position due to proper overbalancing of parts in one direction. Electro-magnetic means M, preferably in the form of a solenoid, is provided to close the switch $S^4$ when energized; a normally open manually settable clock-driven starting switch S is provided to complete the circuit of the solenoid M at any selected time, and a normally closed manually settable clock-actuated limit switch $S^1$ is provided to break the circuit of said solenoid or the like M at the expiration of a given time. With the two switches S and $S^1$ properly set, the starting switch S will bring the radio into operation at the selected time, and limit switch $S^1$ will turn said radio off at the expiration of the desired period, which period, however, cannot be longer than one hour. Switch S is only closed momentarily and it completes the circuit of the solenoid or the like M to tilt the mercury switch $S^4$ to closed position. As it is necessary that this mercury switch be held in closed position to maintain the radio circuit, I provide a circuit maintaining switch $S^3$ to maintain the circuit of said solenoid or the like M after the switch S again opens. This switch $S^3$ is actuated by the solenoid or other electromagnetic means M to close when said solenoid is energized and to open whenever said solenoid is deenergized.

A push button switch $S^5$ is provided to energize the solenoid or the like M, after first setting the limit switch $S^1$, to thereby bring the radio into operation manually if desired, and leave it under the control of said limit switch $S^1$. As soon as switch $S^5$ is closed, with $S^1$ closed, it effects closing of the radio switch $S^4$ and the circuit-maintaining switch $S^3$, so that the set will remain in operation until the circuit of M is broken by said limit switch $S^1$.

It will be seen from the foregoing that the radio may be automatically started by the switch S if desired, or it may be started simply by pushing the push button switch $S^5$, and in either instance, with the limit switch $S^1$ properly set, said limit switch will turn the set off at the expiration of any selected period of no more than one hour duration.

The switch $S^6$ is merely a hand-closed and hand-opened switch which permits turning the radio on and off by hand as usual, when use of the automatic features is not desired.

At $S^2$, I disclose a clock-actuated cutout switch in series with the starting switch S, and said cutout switch $S^2$ automatically prevents the control mechanism from turning the radio on during the night if the controlling means be set for operation during the day, or vice versa.

Figure 5:
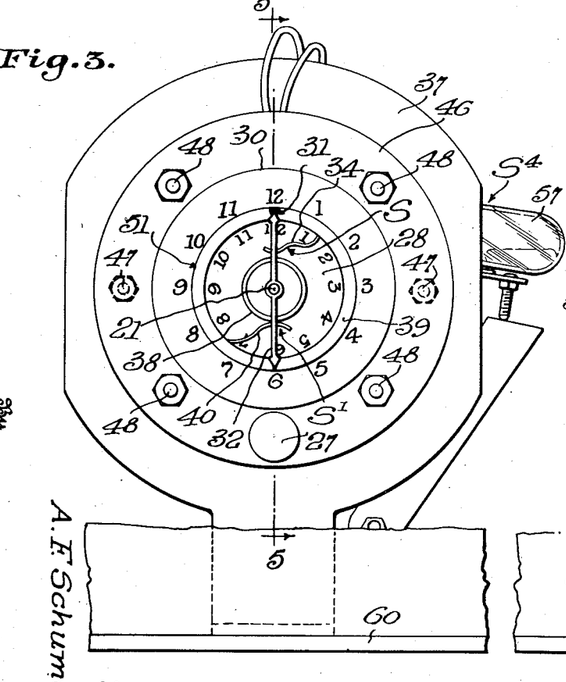
Figure 5 is a vertical longitudinal sectional view substantially on line 5—5 of Fig. 3.

An electric clock has been illustrated at X for actuating the starting switch S, the limit switch $S^1$, and the cut-out switch $S^2$. The hour shaft 20 of the clock X actuates the starting switch S and the cut-out switch $S^2$, and the minute shaft 21 of said clock actuates the limit switch $S^1$. In connection with these shafts and various parts hereinafter to be described, associated with said shafts, it should be observed that practically everything in Fig. 11 is exaggerated for better diagrammatic illustration. Reference should be made to Fig. 5, for example, for a more accurate illustration of proportions, etc.

The starting switch S includes a gear 22 by means of which it may be set to close at any predetermined time, and the limit switch $S^1$ also includes a gear 23 by means of which it may be set to open one hour or less after closing of the switch S. A single setting shaft 24 is provided for setting both switches S and $S^1$, said shaft having one pinion 25 to cooperate with the setting gear 22 of the switch S, and another gear 26 for coaction with the setting gear 23 of the limit switch $S^1$. The distance between the pinions 25 and 26 is less than the distance between the gears 22 and 23 so that only one pinion may be meshed with the cooperating gear at any time. When the setting shaft 24 is shifted to bring 26 into mesh with 23, the limit switch $S^1$ may be set by turning the knob 27 on the front end of said shaft 24, and when said shaft is shifted to bring 25 into mesh with 22, turning of said shaft will set the starting switch S. A dial, preferably numbered from one to twelve, is shown at 28, said dial being cooperable with an indicator 29 when setting the starting switch S. A fixed dial 30 cooperable with an indicator 31, is instrumental when setting the limit switch $S^1$. As much for appearance as anything else, the front end of the minute shaft 21 preferably carries a pointer 32 adjacent the dial 30.

With reference more particularly to the structure of the starting switch S, it will be observed that the setting dial 28 for said switch is in the form of a disk secured to the hour shaft 20 of the clock mechanism X. This disk carries a projecting pin 33 which is spaced from and parallel with the minute shaft 21, and said pin is cooperable with two fixed brushes or contacts 34 and 35 to complete the circuit of the solenoid or the like M (when switch $S^2$ stands closed) when the disk 28 has been turned to a predetermined extent by the clock mechanism. These two contacts or brushes 34 and 35 are appropriately mounted upon a suitable contact-carrying ring 36 (see Figs. 1, 2 and 5), said ring 36 being rigidly carried by the front frame plate 37 of the clock mechanism X. This same plate 37 may well carry the pointer 29 which cooperates with the setting dial 28 of the switch S.

The limit switch $S^1$ includes a contact drum 38 which is secured upon and insulated from the minute shaft 21. Concentric with and spaced outwardly from this contact drum 38 is a brush-carrying ring 39 preferably formed insulating material. This ring 39 carries two brushes 40 and 41 which project both inwardly and outwardly therefrom, the inner ends of said brushes being normally in contact with the drum 38 and the outer ends of said brushes being constantly in contact with two rings 42 and 43 which are concentric with the ring 39 and are fixedly mounted in any suitable way on the clock frame, said rings 42 and 43 being spaced apart by a suitable insulator 44. As long as the inner ends of the brushes 40 and 41 are in contact with the drum 38, current may flow to the solenoid or the like M when its circuit is otherwise completed. The drum 38, however, carries a small insulator 45 to break the contact between the brush 40 and said drum 38 when the latter has been rotated to a predetermined extent by the clock mechanism, and when this break occurs, it deenergizes the solenoid or the like M, permitting the switch $S^4$ to open, breaking the radio circuit.

Figure 9:
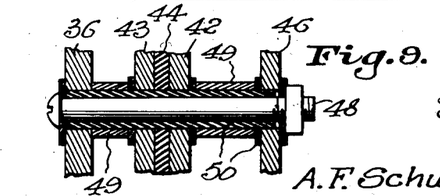
Figure 9 is a detail vertical section on line 9—9 of Fig. 7.

It will be observed that the brush-carrying ring 39 is provided with the gear 23 above described for setting the limit switch $S^1$ (see Fig. 5). By turning this gear and the brush-carrying ring 39, the brush 40 may be spaced any desired distance in advance of the insulator 45 so that the latter will not break the solenoid circuit until a predetermined period has expired. To aid in this setting, the ring 39 carries the pointer 31 above described, and this pointer is cooperable with the fixed dial 30. This dial 30 is secured to a face plate 46. This face plate 46, the two contact rings 42 and 43 and their insulator 44, and the contact-carrying ring 36, are all preferably secured together in suitable spaced relation, in the manner illustrated in Fig. 9, and said plate or ring 36 is fastened to the frame plate 37 of the clock mechanism X, as denoted at 47 in Figs. 1 and 2, for example, the securing means being also dotted in Fig. 3. Referring to Fig. 9, it will be observed that bolts 48, spacers 49 and appropriate insulators 50 are employed in securing 46, 42, 44, 43 and 36 together. The face plate 46 and the contact ring ring 42 are preferably instrumental in rotatably mounting the brush-carrying ring 39 (Fig. 5). In the present showing, the plate 46 has an opening 51 through which the front portion of the ring 39 extends, and said ring 39 is provided with an annular member 52 which lies against the rear side of 46 and the front side of 42 as seen more particularly in Fig. 5.

Figure 6:
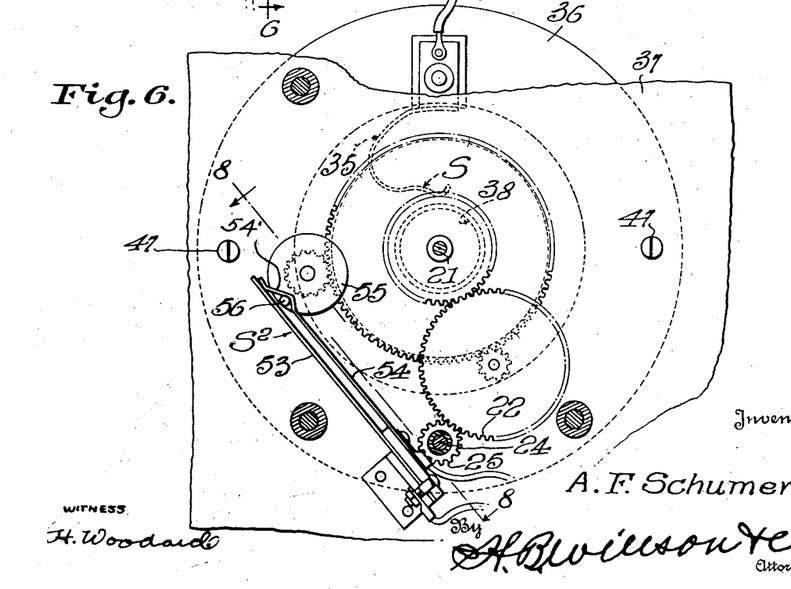
Figures 6 and 7 are vertical transverse sectional views on lines 6—6 and 7—7 of Fig. 5.
Figure 7:
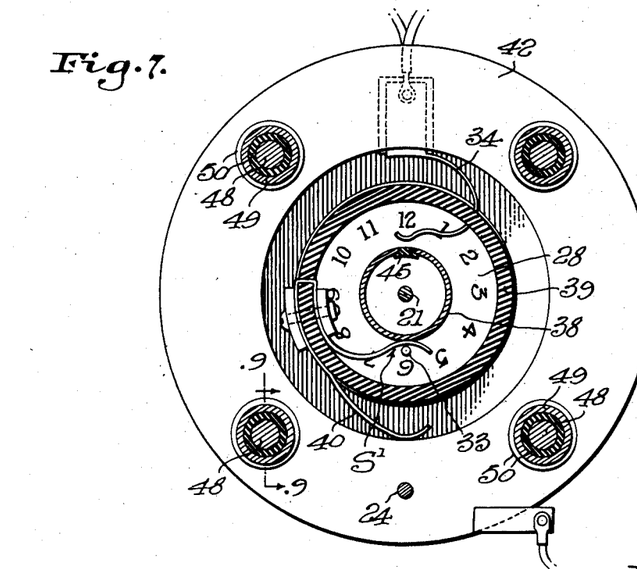
Figure 8:
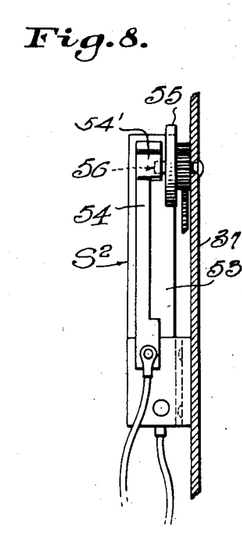
Figure 8 is a detail sectional view showing the twelve-hour cut-out switch, this view being cut substantially on line 8—8 of Fig. 6.

The cutout switch $S^2$ which is in series with the starting switch S, includes two normally contacting spring contacts 53 and 54 (see Figs. 1, 6 and 8) and a clock-driven wheel 55 having a pin 56 for separating said contacts, for a proper interval to prevent said starting switch S from starting the radio at any time during the night with the mechanism set to start radio operation at a corresponding predetermined time during the day, or vice versa. While it is only essential that switch S² be opened and remain open until pin 33 of starting switch S has cleared contacts 34 and 35, to thus prevent radio operation at night if the mechanism be set for day operation, or vice versa, it is obvious that said switch S² may be opened and closed numerous times during any revolution of said hour shaft, as long as said switch S² does not take the radio out of the control of the starting switch S at the predetermined time when S should start the radio (say 11 o'clock in the morning), but does take the set out of the control of said starting switch S twelve hours later (say 11 o'clock at night) when radio starting is not desired. It will thus be seen that switch S² must be opened simultaneously with alternate closures of the starting switch S.

With one setting of the mechanism, it will function to cause radio operation for any selected duration of time within one hour, during day or night. While, at the start of this selected period for radio operation, switch S² must not be open, after the starting switch S has caused closing of both the radio starting switch S⁴ and the radio circuit-maintaining switch S³, repeated opening and closing of switch S² will not affect the radio, for it is then under the control of the limit switch S¹ and not under the control of S or S². At the end of a twelve hour period following starting of the radio by means of the starting switch S, when said starting switch S would again "attempt to start the radio," switch S² is open to "defeat said attempt." Otherwise, after setting the mechanism to start automatic radio operation at any selected time during the day, it would again start the set at the corresponding time each night, or vice versa.

In the present disclosure, the pin 56 on the wheel 55 of the switch S² hooks under a cam 54' on the contact 54 (see Figs. 6 and 8) once in each revolution and thus pulls 54 away from 53, to open the switch for an adequate time and to then permit it to close.

Figure 4:
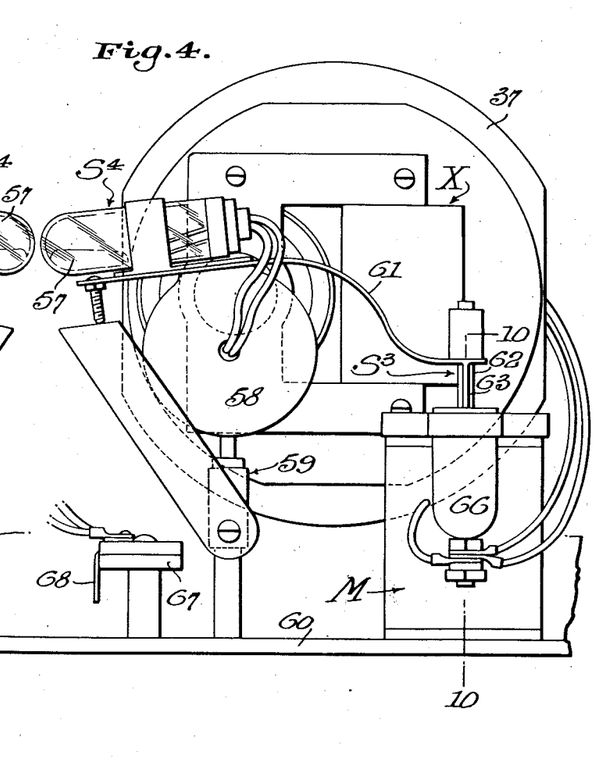
Figure 4 is a rear elevation.
Figure 10:
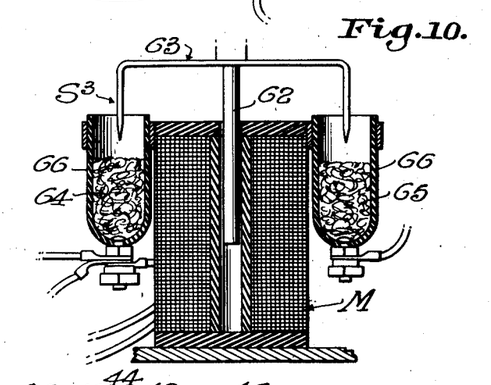
Figure 10 is a sectional view on line 10—10 of Fig. 4.

The mercury switch S⁴ has its actual switch unit 57 suitably mounted upon a pivotally supported insulator 58, the latter being suitably supported at 59 upon an insulating base 60 on which the entire controlling mechanism is mounted in readiness for installation in a radio cabinet. The tiltable support 58 carries an arm 61 which is suitably connected with the solenoid core 62 of the solenoid or the like M (Figs. 4 and 11). This same arm 61 carries an arched bridge member 63 forming part of the circuit maintaining switch S³, the ends of said bridge member 63 being cooperable with two contacts 64 and 65 (Figs. 10 and 11). These contacts are preferably quantities of metal wool or the like within suitable insulating containers 66.

Figure 1:
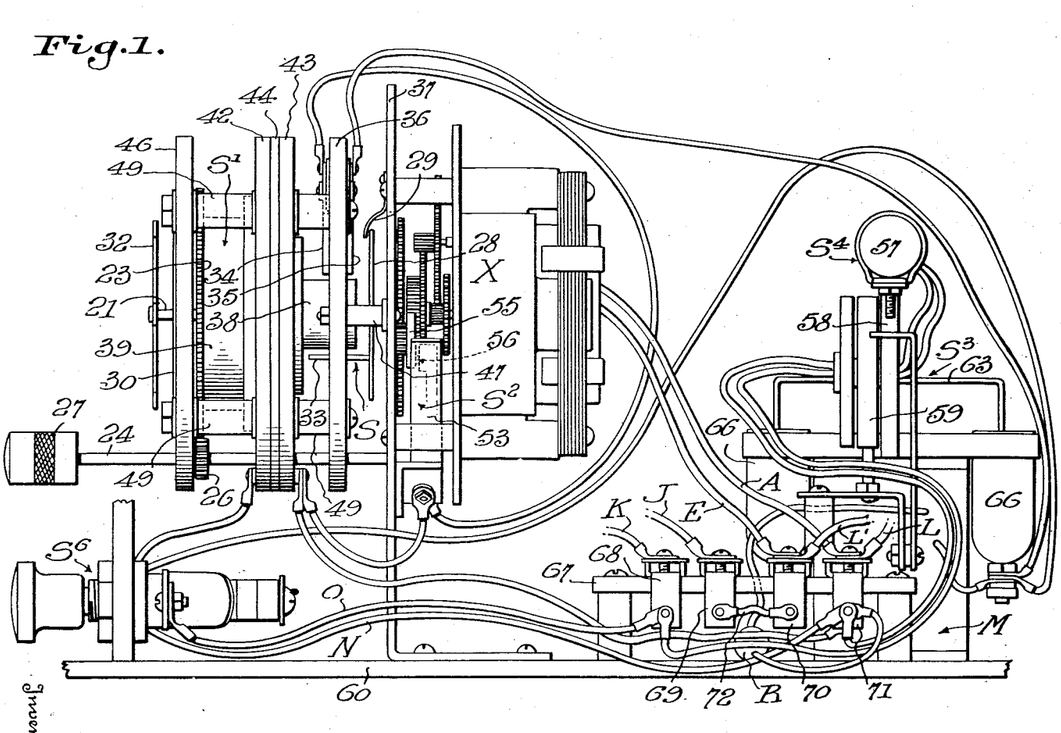
Figure 1 is a side elevation showing the controlling means mounted upon a base in readiness for installation within the usual cabinet of a radio receiving set.
Figure 2:
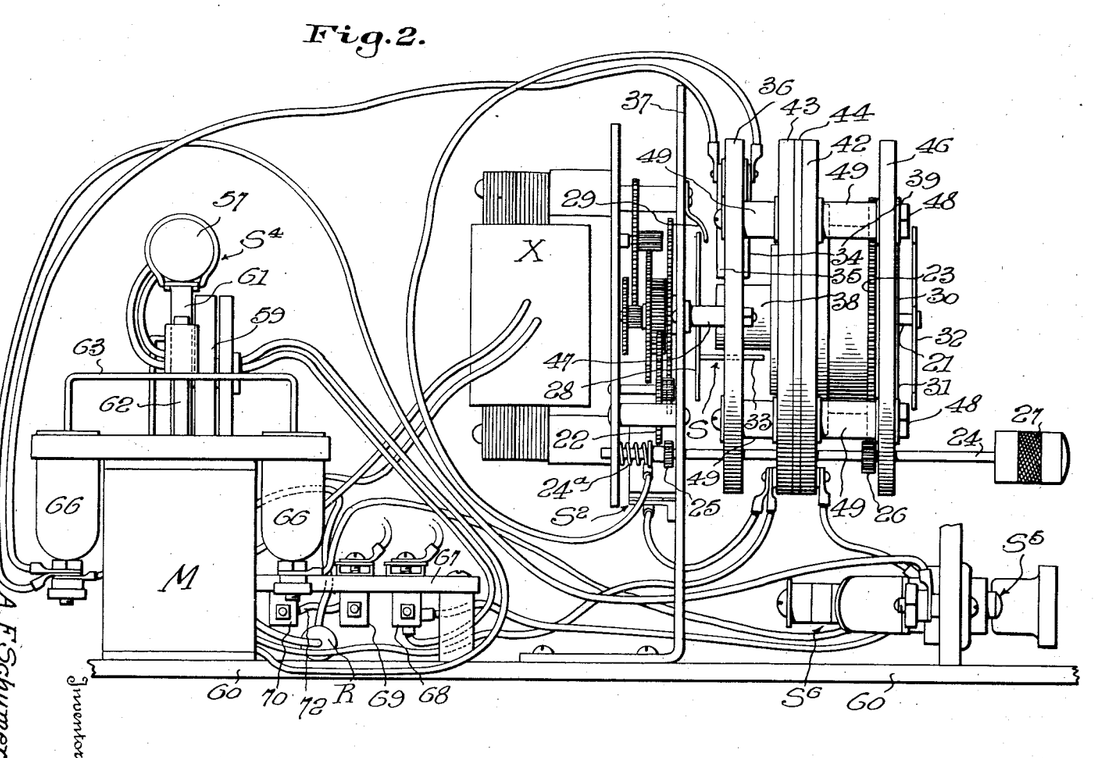
Figure 2 is a side elevation looking in the opposite direction.

At 67, I have illustrated a suitable terminal block secured upon the base 60, said terminal block having four conducting strips 68, 69, 70 and 71 (see Figs. 1 and 11). One line wire L is connected with the strip 71 and the other line wire L' is connected with the adjacent strip 70. This strip 70 is also connected with the adjacent strip 69 by a jumper 72. The two wires J and K leading to the radio receiving set (see Fig. 11) are connected with the strips 69 and 68 respectively. For the rest of the wiring now to be described, see Fig. 11 in particular, and see Fig. 11 for more expeditious tracing of the circuits.

A wire A extends from the strip 71 to a resistance R, and a wire B connects this resistance with one terminal of the solenoid M. A wire C extends from the other terminal of this solenoid to the contact or brush 34 of the starting switch S. From the other contact or brush 35 of this switch S, a wire D extends to the contact 54 of the cut-out switch S², and from the other contact 53 of this switch, a wire E extends to the strip 70 on the terminal block 67. A wire A¹ branches from wire A and leads to one contact of the radio circuit switch S⁴, and another wire A² leads from the other contact of this switch to the strip 68 on the terminal block 67. A wire F is connected at one end with the contact 64 of the maintaining switch S³ and is connected at its other end to the wire C above described. The other contact 65 of this switch S³ is connected by wire G with the contact ring 43 of the limit switch S¹, and a wire H extends from the other contact ring 42 of this limit switch to the wire E above described. A wire I extends from the contact ring 43 to the push button S⁵, and a wire I' extends from this switch to the wire F above described. The two fixed contacts of the manual switch S⁶ are connected with two wires N and O respectively, N being connected to the strip 71 on the terminal block 67 and O being connected to the strip 68 on said block. Wires P and Q for the electric clock X are branched from the wires E and N respectively.

It will be recalled that the starting switch S may be manually set so that said switch will close at any desired time. This closing is of course effected by the pin 33 on the dial 28 coming in contact with and bridging between the two fixed contacts 34 and 35. When this occurs, current flows from line wire L to strip 71, through A to R, from R through B to M, from M through C to 34, from 34 to 35 through 33, from 35 through D to contact 54 of the cut-out switch S², through 54 and 53 of this switch to wire E, through E to strip 70 on the terminal block 67 and back to the line through wire L'. This flow of current energizes the solenoid or the like M and causes it to tilt the mercury switch S⁴ to closed position. Current then flows from L to A, from A through A¹ to switch S⁴, through this closed switch to A², from A² to strip 68 on the terminal block 67, from 68 to the set through K, from the set through J to strip 69, from 69 to 70 through jumper 72, and through 70 to L'. Current flow in this manner, of course, operates the radio just as if a switch for its circuit had been closed by hand or in some other way.

Closing of the switch S⁴ by means of the solenoid M, also closed the circuit maintaining switch S³ for said solenoid, and immediately after closing of S³, switch S opens. As soon as S³ is closed, current flows from L to A, through A to resistance R, from this resistance through B to solenoid M, from this solenoid through C to F, through F to contact 64 of switch S³, from 64 through bridge member 63 of this switch S³ to contact 65 thereof, from 65 through G to contact ring 43 of limit switch S¹, from 43 through brush 41 to contact drum 39, through this drum and the brush 40 to contact ring 42, from 42 through H to E and through E and 70 to L'.

It will be seen from the above that maintenance of the circuit through solenoid M to hold the radio circuit switch S⁴ closed, is dependent upon the limit switch S¹, it being necessary that both brushes 40 and 41 of this limit switch be in contact with the drum 38 thereof to maintain the circuit. It will also be recalled that this limit switch is adjustable so that its insulator 45 may be disposed any desired distance in advance of the brush 40 with which it coacts. Thus when sufficient time interval has elapsed (after closing of switch S) for the insulator 45 to engage the brush 40, said insulator breaks the circuit of the solenoid M, deenergizing the latter and freeing its core 62, with the result that the radio circuit switch S⁴ promptly moves to open position and the same being true of the maintaining switch S³. Therefore, it will be clear that the previously set clock-actuated starting switch S causes turning on of the radio at any selected time, and that the limit switch S¹ causes turning off of the set at the expiration of the predetermined period. It will also be clear that switch S¹ again opens shortly after it closes and that from this time until limit switch S¹ opens, the circuit of solenoid M is maintained by the switch S³.

As above explained, if the controlling means be set to operate at a selected time during the day, it would not be desirable to have it operate also at a corresponding time during the night, or vice versa, and the clock-actuated cutout switch S² prevents this.

If it be desired to start the radio by hand and simply have the limit switch S¹ stop it at the expiration of a predetermined time for which said switch is set, this may be done by first setting said limit switch S¹ and then pushing the push button switch S⁵. When this switch S⁵ is closed, current flows through L and 71 to A, through R and B to M, through C and F to I', through S⁵ to I, through I to 43, from 43 through 41 and 38 to 40, through 40 to 42, from 42 through H to E and through E to 70 and L'. The solenoid M is thus energized, causing it to close both switches S⁴ and S³, which switches then function as previously described until switch S¹ again opens.

Whenever the radio is to be turned on by hand and turned off by hand, the switch S⁶ is used. When this switch is closed, current flows from L to 71, through N to switch S⁶, from S⁶ through O to strip 68, through 68 and K to the receiving set, through the set and back through J to strip 69, from 69 through jumper 72 to strip 70 and through 70 back to L'.

To facilitate setting of the starting and limit switches, it is preferable that a spring 24ᵃ be associated with the setting shaft 24 to normally hold this shaft at one extreme or the other of its sliding movement, in which position one or the other of the pinions 25, 26 will be in mesh with the cooperating gear (22 or 23). It is preferable that spring 24ᵃ normally hold the shaft 24 forwardly, meshing 26 with 23. When 25 is to be meshed with 22 to set the starting switch S, it is simply necessary to push rearwardly on shaft 24 to accomplish this. Release of the pressure will then cause forward movement of the shaft to mesh 26 with 23 in order to set the limit switch S¹.

From the foregoing taken in connection with the accompanying drawings, it will be seen that novel and advantageous provision has been made for carrying out the objects of the invention. While preferences have been illustrated and described, it is to be understood that numerous variations may be made within the scope of the invention as claimed.

I claim:

1. A radio controlling means comprising a clock having an hour shaft and a minute shaft, a self-opening and normally open radio circuit switch, electro-magnetic means for closing said radio circuit switch and holding it closed, a normally open circuit-maintaining switch for said electro-magnetic means, said circuit-maintaining switch being closable and holdable in closed position by means of said electro-magnetic means, a normally open manually settable starting switch controlled by said hour shaft for initially closing the circuit of said electro-magnetic means to energize the latter and cause it to close both said radio circuit switch and said circuit maintaining switch, a normally closed manually settable limit switch controlled by said minute shaft for breaking the circuit of said electro-magnetic means to allow said radio circuit switch and said circuit-maintaining switch to open, and wiring operatively connecting said starting switch, said circuit-maintaining switch, and said limit switch with said electro-magnetic means.

2. A radio controlling means as specified in claim 1; together with a normally open manually closable switch connected with said wiring for energizing said electro-magnetic means if the radio is to be turned on by hand and turned off by means of said limit switch.

3. A radio controlling means as specified in claim 1; and including a single manually rotatable setting device for both said starting switch and said limit switch, said setting device being shiftable to two positions to manually set first one switch and then the other.

4. A radio controlling means as specified in claim 1; and a normally closed cutout switch in series with said starting switch, said normally closed cutout switch being so controlled by said hour shaft as to open simultaneously with alternate closures of said starting switch.

5. In a radio controlling means, a clock, a starting switch and a limit switch driven by said clock for turning the radio on and off respectively, and a normally closed cutout switch in series with said starting switch, said cutout switch being so controlled by said clock as to open simultaneously with alternate closures of said starting switch.

6. In a radio circuit controlling means, a clock mechanism having an hour shaft and a minute shaft, a normally open starting switch actuated by said hour shaft and having a gear by means of which it may be set to close at any selected time, a normally closed limit switch actuated by said minute shaft and having a gear by means of which it may be set to open after closing of said starting switch, the two gears being axially alined, a manually rotatable setting shaft having two pinions for coacting with said gears respectively, said pinions being spaced apart a distance different from that between said gears, and means mounting said setting shaft for axial shifting to bring either pinion into mesh with its cooperating gear, whereby either of said switches may be set by rotating said setting shaft.

7. In a radio circuit controlling means, a clock-driven contact drum, a rotatably mounted brush-carrying ring concentric with and spaced outwardly from said contact drum, two fixed contact rings concentric with and spaced outwardly from said brush-carrying ring, two brushes carried by said brush-carrying ring, said brushes having inner ends normally contacting with said contact drum and outer ends constantly contacting with said fixed contact rings respectively, an insulator carried by said contact drum to break contact between the latter and one of said brushes when said drum has rotated to a predetermined extent, and means for turning said brush-carrying ring with respect to said contact drum to set said one of said brushes any desired distance in advance of said insulator.

ARTHUR F. SCHUMERT.